(12) United States Patent
Wu et al.

(10) Patent No.: US 12,235,711 B2
(45) Date of Patent: Feb. 25, 2025

(54) POWER SUPPLY CONTROL METHOD, SYSTEM AND DEVICE FOR SERVER

(71) Applicant: INSPUR SUZHOU INTELLIGENT TECHNOLOGY CO., LTD., Jiangsu (CN)

(72) Inventors: Junxun Wu, Jiangsu (CN); Guanmin Huang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/250,417

(22) PCT Filed: Jul. 29, 2021

(86) PCT No.: PCT/CN2021/109190
§ 371 (c)(1),
(2) Date: Apr. 25, 2023

(87) PCT Pub. No.: WO2022/088800
PCT Pub. Date: May 5, 2022

(65) Prior Publication Data
US 2025/0021154 A1  Jan. 16, 2025

(30) Foreign Application Priority Data
Oct. 29, 2020  (CN) .......................... 202011181718.7

(51) Int. Cl.
*G06F 1/32* (2019.01)
*G06F 1/3287* (2019.01)

(52) U.S. Cl.
CPC .................................. *G06F 1/3287* (2013.01)

(58) Field of Classification Search
CPC ..................................................... G06F 1/3287
See application file for complete search history.

(56) References Cited

U.S. PATENT DOCUMENTS

| | | | |
|---|---|---|---|
| 2006/0161794 A1* | 7/2006 | Chiasson | G06F 1/3203 713/300 |
| 2008/0178019 A1* | 7/2008 | McGrane | G06F 1/26 713/320 |

(Continued)

FOREIGN PATENT DOCUMENTS

| | | |
|---|---|---|
| CN | 103188277 A | 7/2013 |
| CN | 105068915 A | 11/2015 |

(Continued)

OTHER PUBLICATIONS

International search report for PCT/CN2021/109190 mailed on Nov. 11, 2021.

(Continued)

*Primary Examiner* — Stefan Stoynov
(74) *Attorney, Agent, or Firm* — Dennemeyer & Associates LLC

(57) ABSTRACT

A power supply control method, system and device for a server are provided. The method includes: dividing a utilization rate of a system main power supply into different levels in advance, and setting a GPU power control policy corresponding to a respective one of the different levels of the utilization rate of the system main power supply, wherein a suppression degree, on a computing capability of GPUs in a system, of the set GPU power control policy increases with the increase in the level of the utilization rate of the system main power supply; acquiring an actual utilization rate of the system main power supply, and determining a target utilization rate level corresponding to the actual utilization rate; and performing power supply control on the GPUs in the system according to the GPU power control policy corresponding to the target utilization rate level.

20 Claims, 2 Drawing Sheets

(56) References Cited

U.S. PATENT DOCUMENTS

2017/0262953 A1    9/2017    Ragupathi et al.
2020/0042068 A1*    2/2020    Rong .................... G06F 1/3203

FOREIGN PATENT DOCUMENTS

| | | |
|---|---|---|
| CN | 105260003 A | 1/2016 |
| CN | 109446026 A | 3/2019 |
| CN | 208903299 U | 5/2019 |
| CN | 111009883 A | 4/2020 |
| CN | 111290560 A | 6/2020 |
| CN | 111352815 A | 6/2020 |
| CN | 111475293 A | 7/2020 |
| CN | 112114647 A | 12/2020 |
| CN | 112670948 A | 4/2021 |

OTHER PUBLICATIONS

Search report for Chinese application 202011181718.7 filed Oct. 29, 2020.

* cited by examiner

POWER SUPPLY CONTROL METHOD, SYSTEM AND DEVICE FOR SERVER

CROSS-REFERENCE TO RELATED APPLICATIONS

This is a 35 U.S.C. 371 National Stage Patent Application of International Application No. PCT/CN2021/109190, filed Jul. 29, 2021, which claims priority to Chinese application 202011181718.7, filed Oct. 29, 2020, each of which is hereby incorporated by reference in its entirety.

TECHNICAL FIELD

The present disclosure relates to the field of servers, and in particular, to a power supply control method, system and device for a server.

BACKGROUND

An Artificial Intelligence (AI) server needs to have a large number of parallel computing capabilities, and Graphics Processing Units (GPUs) are more suitable for parallel computing and therefore are widely used in the AI server. The GPU is a key factor that greatly influences the performance of the AI server. The performance of the AI server increases with the increase of the number of the GPUs. However, with the increase of the number of the GPUs, more current is required by the GPUs, and the current control becomes difficult. When the GPU needs to perform high-performance computing in a short time, a sharp rise of the current within a short time is allowed, and such current within the short time is referred to as an Electrical Design Point Peak current (EDPP). The EDPP is usually 2 to 3 times the normal current, and is more difficult to control. If the current is not controlled well, the system main power supply will be directly shut down or restarted.

In the related art, a GPU EDPP is controlled in a manner of adding a large capacitor in a Power Supply Unit (PSU) which supplies power to a GPU or on a main power supply board of the system, so as to prevent the EDPP of the GPU within a short time. Further, as shown in FIG. 1, the GPU EDPP is also controlled by adding a management unit between the PSU (system main power supply) and each GPU, so that when the utilization rate of the system main power supply is too high, the management unit simultaneously triggers power brake signals of respective GPUs to trigger the GPUs to change high-performance computing into low-performance computing, so as to reduce the power consumption of the GPUs and prevent the shutdown or restart of the system main power supply. However, the above manner in the related art greatly reduces the computing performance of the entire AI server.

Therefore, how to provide a solution for solving the described technical problem is the problem currently required to be solved by those having ordinary skill in the art.

SUMMARY

The embodiments of the present disclosure provide a power supply control method, system and device for a server. By means of a method of dividing a utilization rate of a system main power supply into different levels, the higher the utilization rate of the system main power supply is, the more a computing capability of the GPUs in the system is suppressed, and correspondingly the more the power consumption of the GPUs in the system is reduced, thereby guaranteeing the computing performance of the server as far as possible while preventing the shutdown or restart of the system main power supply.

The embodiments of the present disclosure provide a power supply control method for a server, including:

dividing a utilization rate of a system main power supply into different levels in advance, and setting a GPU power control policy corresponding to a respective one of the different levels of the utilization rate of the system main power supply, wherein the level of the utilization rate of the system main power supply increases with the increase in the utilization rate of the system main power supply, and a suppression degree, on a computing capability of GPUs in a system, of the set GPU power control policy increases with the increase in the level of the utilization rate of the system main power supply;

acquiring an actual utilization rate of the system main power supply, and determining, according to a result of the level division on the utilization rate of the system main power supply, a target utilization rate level corresponding to the actual utilization rate; and performing power supply control on the GPUs in the system according to the GPU power control policy corresponding to the target utilization rate level.

In some exemplary implementations, the process of performing the level division on the utilization rate of the system main power supply in advance, and setting the GPU power control policy corresponding to the respective one of the different levels of the utilization rate of the system main power supply includes:

dividing the utilization rate of the system main power supply into three levels in advance, to obtain a low-level utilization rate, a medium-level utilization rate and a high-level utilization rate;

setting, corresponding to the low-level utilization rate, a first GPU power control policy used for adjusting load balance distribution of the GPUs in the system;

setting, corresponding to the medium-level utilization rate, a second GPU power control policy used for selecting a target trigger GPU from the GPUs in the system according to a preset GPU trigger selection policy, and triggering a power brake signal for the target trigger GPU; and setting, corresponding to the high-level utilization rate, a third GPU power control policy used for selecting a target turn-off GPU from the GPUs in the system according to a preset GPU turn-off selection policy and turning off power supply of the target turn-off GPU.

In some exemplary implementations, the process of adjusting the load balance distribution of the GPUs in the system includes:

pre-configuring, for a respective GPU of the GPUs in the system, an integrated chip for acquiring power supply parameters of the respective GPU, and acquiring a current parameter of the respective GPU by using the integrated chip;

determining whether the current parameter of a target GPU is greater than a preset current threshold: when the current parameter of the target GPU is greater than the preset current threshold, determining that the target GPU is in a high workload state; and when the current parameter of the target GPU is not greater than the preset current threshold, determining that the target GPU is in a low workload state, wherein the target GPU is any GPU of the GPUs in the system; and distributing, in a balanced manner, a part of computing workloads of GPUs in the high workload state to GPUs in the low workload state, so that the GPUs originally in the high workload state transit to the low workload state.

In some exemplary implementations, the process of selecting the target trigger GPU from the GPUs in the system according to the preset GPU trigger selection policy, and triggering the power brake signal for the target trigger GPU includes:

pre-configuring, for a respective GPU of the GPUs in the system, an integrated chip for acquiring power supply parameters of the respective GPU, and acquiring a current parameter of the respective GPU by using the integrated chip:

determining whether the current parameter of a target GPU is greater than a preset current threshold, and when the current parameter of the target GPU is greater than the preset current threshold, determining that the target GPU is in a high workload state, wherein the target GPU is any GPU of the GPUs in the system; and sequentially triggering the power brake signal for a respective GPU of GPUs in the high workload state, until the actual utilization rate of the system main power supply decreases to the low-level utilization rate.

In some exemplary implementations, the process of selecting the target turn-off GPU from the GPUs in the system according to the preset GPU turn-off selection policy and turning off power supply of the target turn-off GPU includes:

pre-configuring, for a respective GPU of the GPUs in the system, an integrated chip for acquiring power supply parameters of the respective GPU, and acquiring a current parameter of the respective GPU by using the integrated chip:

determining whether the current parameter of a target GPU is greater than a preset current threshold: when the current parameter of the target GPU is greater than the preset current threshold, determining that the target GPU is in a high workload state; and when the current parameter of the target GPU is not greater than the preset current threshold, determining that the target GPU is in a low workload state, wherein the target GPU is any GPU of the GPUs in the system; and first turning off power supply of GPUs in the low workload state, and then turning off power supply of GPUs in the high workload state, until the actual utilization rate of the system main power supply decreases to the medium-level utilization rate.

In some exemplary implementations, the power supply control method for the server may further include:

respectively comparing a respective one of the power supply parameters of the target GPU acquired by using the integrated chip with a preset parameter security threshold corresponding to the respective power supply parameter; and when any power supply parameter of the target GPU is greater than the preset parameter security threshold corresponding to the power supply parameter, directly turning off the power supply of the target GPU by using the integrated chip.

The embodiments of the present disclosure also provide a power supply control system for a server, including:

a presetting module, configured to divide a utilization rate of a system main power supply into different levels in advance, and set a GPU power control policy corresponding to a respective one of the different levels of the utilization rate of the system main power supply, wherein the level of the utilization rate of the system main power supply increases with the increase in the utilization rate of the system main power supply, and a suppression degree, on a computing capability of GPUs in a system, of the set GPU power control policy increases with the increase in the level of the utilization rate of the system main power supply:

a determination module, configured to acquire an actual utilization rate of the system main power supply, and determine, according to a result of the level division on the utilization rate of the system main power supply, a target utilization rate level corresponding to the actual utilization rate; and a control module, configured to perform power supply control on the GPUs in the system according to the GPU power control policy corresponding to the target utilization rate level.

In some exemplary implementations, the presetting module is configured to:

divide the utilization rate of the system main power supply into three levels in advance, to obtain a low-level utilization rate, a medium-level utilization rate and a high-level utilization rate:

set, corresponding to the low-level utilization rate, a first GPU power control policy used for adjusting load balance distribution of the GPUs in the system:

set, corresponding to the medium-level utilization rate, a second GPU power control policy used for selecting a target trigger GPU from the GPUs in the system according to a preset GPU trigger selection policy, and triggering a power brake signal of the target triggering GPU; and set, corresponding to the high-level utilization rate, a third GPU power control policy used for selecting a target turn-off GPU from the GPUs in the system according to a preset GPU turn-off selection policy and turning off power supply of the target turn-off GPU.

In some exemplary implementations, the process of adjusting the load balance distribution of the GPUs in the system includes:

pre-configuring, for a respective GPU of the GPUs in the system, an integrated chip for acquiring power supply parameters of the respective GPU, and acquiring a current parameter of the respective GPU by using the integrated chip:

determining whether the current parameter of a target GPU is greater than a preset current threshold: when the current parameter of the target GPU is greater than the preset current threshold, determining that the target GPU is in a high workload state; and when the current parameter of the target GPU is not greater than the preset current threshold, determining that the target GPU is in a low workload state, wherein the target GPU is any GPU of the GPUs in the system; and distributing, in a balanced manner, a part of computing workloads of GPUs in the high workload state to GPUs in the low workload state, so that the GPUs originally in the high workload state transit to the low workload state.

The embodiments of the present disclosure also provide a power supply control device for a server, including:

a memory, configured to store a computer program; and a processor, provided between a system main power supply and GPUs in a system, and configured to implement operations of the power supply control method for the server when executing the computer program.

The embodiments of the present disclosure provide a power supply control method for a server. The method includes: dividing a utilization rate of a system main power supply into different levels in advance, and setting a GPU power control policy corresponding to a respective one of the different levels of the utilization rate of the system main power supply, wherein the level of the utilization rate of the system main power supply increases with the increase in the utilization rate of the system main power supply, and a suppression degree, on a computing capability of GPUs in a system, of the set GPU power control policy increases with the increase in the level of the utilization rate of the system main power supply: acquiring an actual utilization rate of the system main power supply, and determining, according to a result of the level division on the utilization rate of the system main power supply, a target utilization rate level corresponding to the actual utilization rate; and performing power supply control on the GPUs in the system according to the GPU power control policy corresponding to the target utilization rate level. By adopting the method of dividing a utilization rate of a system main power supply into different levels, the higher the utilization rate of the system main power supply is, the more a computing capability of the GPUs in the system is suppressed, and correspondingly the more the power consumption of the GPUs in the system is reduced, thereby guaranteeing the computing performance of the server as far as possible while preventing the shutdown or restart of the system main power supply.

The embodiments of the present disclosure also provide a power supply control system and device for a server, which have the same beneficial effects as the above power supply control method.

BRIEF DESCRIPTION OF THE DRAWINGS

In order to describe the technical solutions in the embodiments of the present disclosure more clearly, hereinafter, accompanying drawings requiring to be used in the related art and the embodiments are introduced briefly. Apparently, the accompanying drawings in the following description merely relate to some embodiments of the present disclosure, and for a person having ordinary skill in the art, other accompanying drawings may also be derived from these accompanying drawings without involving any inventive effort.

DETAILED DESCRIPTION

The embodiments of the present disclosure provide a power supply control method, system and device for a server. By means of a method of dividing a utilization rate of a system main power supply into different levels, the higher the utilization rate of the system main power supply is, the more a computing capability of the GPUs in the system is suppressed, and correspondingly the more the power consumption of the GPUs in the system is reduced, thereby guaranteeing the computing performance of the server as far as possible while preventing the shutdown or restart of the system main power supply.

In order to make objects, technical solutions and advantages of the embodiments of the present disclosure clearer, hereinafter, the technical solutions in the embodiments of the present disclosure will be described clearly and completely with reference to the accompanying drawings of the embodiments of the present disclosure. Obviously, the embodiments as described are a part of the embodiments of the present disclosure, not all of the embodiments. All other embodiments obtained by a person having ordinary skill in the art based on the embodiments of the present disclosure without any inventive effort shall all fall within the scope of protection of the present disclosure.

Figure 1:
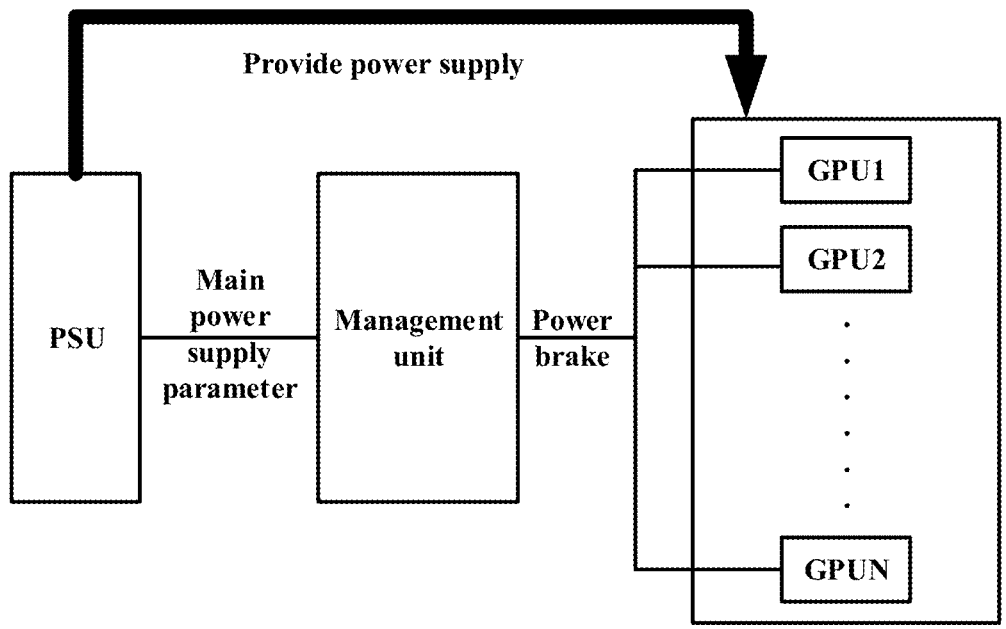
FIG. 1 is a schematic diagram of power supply control of a server in the related art.
Figure 2:
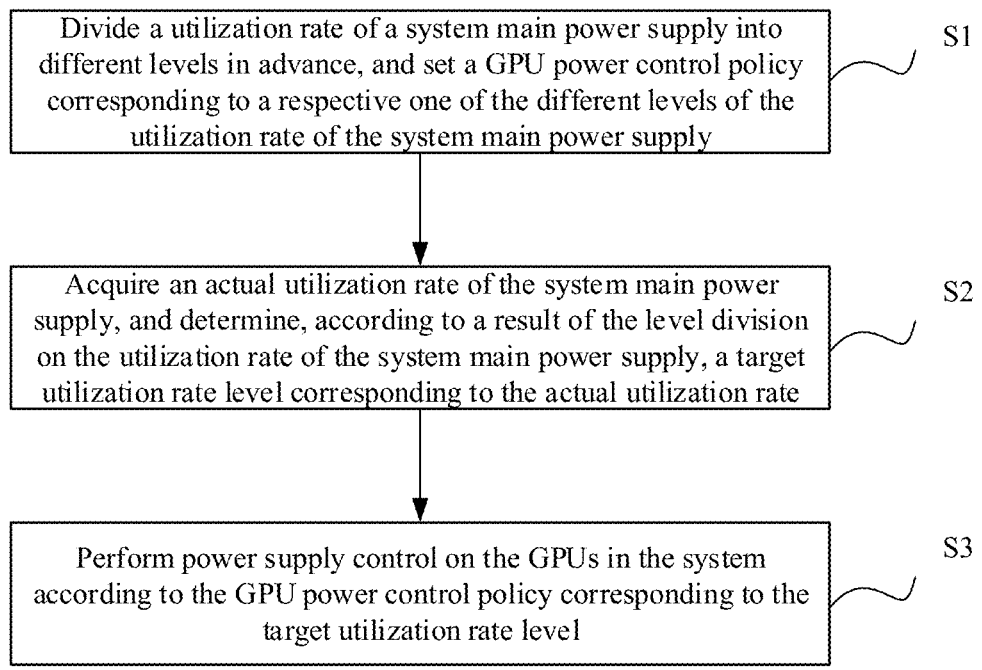
FIG. 2 is a flowchart of a power supply control method for a server according to the embodiments of the present disclosure.

Please refer to FIG. 2, FIG. 2 is a flowchart of a power supply control method for a server according to the embodiments of the present disclosure.

The power supply control method for the server includes operations S1 to S3 which are described in detail below.

At S1, a utilization rate of a system main power supply is divided into different levels in advance, and a GPU power control policy corresponding to a respective one of the different levels of the utilization rate of the system main power supply is set.

In some exemplary implementations of the present disclosure, the utilization rate of the system main power supply is divided in advance. It should be noted that the higher level of the system main power supply, the higher the utilization rate of the system main power supply, likewise, the lower level of the system main power supply, the lower the utilization rate of the system main power supply. For example, when the utilization rate of the system main power supply is below 80%, the system main power supply has no risk of shutdown or restart, it is not necessary to divide the utilization rate of the system main power supply having a utilization rate below 80%, and the utilization rate of the system main power supply equal to 80% or above 80% may be divided into levels, for example, 80-90% is set as a first level, 90-100% is set as a second level, 100% or above are set as a third level, and the levels are ranked as follows: the first level<the second level<the third level.

Furthermore, in the embodiments of the present disclosure, GPU power control policies respectively corresponding to different levels of the utilization rate of the system main power supply are set, i.e. a GPU power control policy corresponding to each level of the utilization rate of the system main power supply is set. It may be understood that, the higher the utilization rate of the system main power supply is, the higher the risk of shutdown or restart of the system main power supply is, and therefore, the level of the utilization rate of the system main power supply increases with the increase in the utilization rate of the system main power supply, and a suppression degree, on a computing capability of GPUs in a system, of the set GPU power control policy increases with the increase in the level of the utilization rate of the system main power supply. For example, when the utilization rate of the system main power supply is higher, the computing capability of the GPUs in the system is made weaker, and more power consumption of the GPUs in the system is reduced, so as to prevent the shutdown or restart of the system main power supply: when the utilization rate of the system main power supply is lower, the computing capability of the GPUs in the system is made stronger, and less power consumption of the GPUs in the system is reduced, so as to ensure the computing performance of the server. To sum up, the solution ensures the computing performance of the server as far as possible while preventing the shutdown or restart of the system main power supply.

At S2, an actual utilization rate of the system main power supply is acquired, and a target utilization rate level corresponding to the actual utilization rate is determined according to a result of the level division on the utilization rate of the system main power supply.

In some exemplary implementations, an actual utilization rate of the system main power supply is acquired, and an actual utilization rate level (referred to as a target utilization rate level) corresponding to the actual utilization rate is determined according to a result of the level division on the utilization rate of the system main power supply, so as to subsequently determine a GPU power control policy required at the actual utilization rate of the system main power supply.

At S3, power supply control is performed on the GPUs in the system according to the GPU power control policy corresponding to the target utilization rate level.

In some exemplary implementations, after determining the target utilization rate level corresponding to the actual utilization rate of the system main power supply, a GPU power control policy corresponding to the target utilization rate level is determined according to a correlation between the utilization rate level and the GPU power control policy, and then power supply control is performed on the GPUs in the system according to the GPU power control policy corresponding to the target utilization rate level.

The embodiments of the present disclosure provide a power supply control method for a server. The method includes: dividing a utilization rate of a system main power supply into different levels in advance, and setting a GPU power control policy corresponding to a respective one of the different levels of the utilization rate of the system main power supply, wherein the level of the utilization rate of the system main power supply increases with the increase in the utilization rate of the system main power supply, and a suppression degree, on a computing capability of GPUs in a system, of the set GPU power control policy increases with the increase in the level of the utilization rate of the system main power supply: acquiring an actual utilization rate of the system main power supply, and determining, according to a result of the level division on the utilization rate of the system main power supply, a target utilization rate level corresponding to the actual utilization rate; and performing power supply control on the GPUs in the system according to the GPU power control policy corresponding to the target utilization rate level. By adopting the method of dividing a utilization rate of a system main power supply into different levels, the higher the utilization rate of the system main power supply is, the more a computing capability of the GPUs in the system is suppressed, and correspondingly the more the power consumption of the GPUs in the system is reduced, thereby guaranteeing the computing performance of the server as far as possible while preventing the shutdown or restart of the system main power supply.

Based on the foregoing embodiment:

As an exemplary embodiment, the process of performing the level division on the utilization rate of the system main power supply in advance, and setting the GPU power control policy corresponding to the respective one of the different levels of the utilization rate of the system main power supply includes:

dividing the utilization rate of the system main power supply into three levels in advance, to obtain a low-level utilization rate, a medium-level utilization rate and a high-level utilization rate:

setting, corresponding to the low-level utilization rate, a first GPU power control policy used for adjusting load balance distribution of the GPUs in the system:

setting, corresponding to the medium-level utilization rate, a second GPU power control policy used for selecting a target trigger GPU from the GPUs in the system according to a preset GPU trigger selection policy, and triggering a power brake signal for the target trigger GPU:

setting, corresponding to the high-level utilization rate, a third GPU power control policy used for selecting a target turn-off GPU from the GPUs in the system according to a preset GPU turn-off selection policy and turning off power supply of the target turn-off GPU.

It should be noted that the presetting in the embodiments of the present disclosure is performed in advance, and only needs to be performed once, and does not need to be performed again unless the setting needs to be modified according to actual situations.

In some exemplary implementations of the present disclosure, the utilization rate of the system main power supply is divided into three levels: low, medium and high, so as to obtain a low-level utilization rate, a medium-level utilization rate and a high-level utilization rate. Considering that a suppression degree, on a computing capability of GPUs in a system, of the set GPU power control policy increases with the increase in the level of the utilization rate of the system main power supply, the following setting for the GPU power control policy is applied. A first GPU power control policy corresponding to the low-level utilization rate in the embodiments of the present disclosure includes: adjusting load balance distribution of the GPUs in the system, that is, distributing, in a balanced manner, a part of computational workload of GPUs in the high workload state to GPUs in the low workload state, so that the GPUs originally in the high workload state transit to the low workload state. As the current of the GPU in the high workload state is generally 2 to 3 times of the current of the GPU in the low workload state, the power consumption of the GPU of the system is reduced, thereby preventing the shutdown or restart of the system main power supply, without affecting the computing performance of a server. A second GPU power control policy corresponding to the medium-level utilization rate includes: according to a preset GPU trigger selection policy, selecting, from the GPUs in the system, a GPU (referred to as a target trigger GPU) which will perform low-performance computing instead of high-performance computing, and then triggering a power brake signal for the target trigger GPU, thereby reducing the power consumption of the GPUs in the system, so as to prevent the shutdown or restart of the system main power supply. A third GPU power control policy corresponding to the high-level utilization rate includes: according to a preset GPU turn-off selection policy, selecting, from the GPUs in the system, a GPU (referred to as a target turn-off GPU) for which the power supply will be turned off, and then turning off power supply of the target turn-off GPU, thereby reducing the power consumption of the GPUs in the system, so as to prevent the shutdown or restart of the system main power supply.

For example, the utilization rate in a range of 80-90% is set as a low-level utilization rate (warning), the utilization rate in a range of 90-100% is set as a medium-level utilization rate (critical), and the utilization rate of 100% or above is set as a high-level utilization rate (fatal). The GPU power control policies respectively corresponding to the different levels of utilization rate are as shown in Table 1 below:

TABLE 1

| Utilization rate of the power supply | GPU power control policy |
| --- | --- |
| 80-90% | Redistribute the load |
| 90-100% | Start a power brake signal |
| 100% or above | Turn off the power supplies of a part of GPUs |

As an exemplary embodiment, the process of adjusting the load balance distribution of the GPUs in the system includes:

pre-configuring, for a respective GPU of the GPUs in the system, an integrated chip for acquiring power supply parameters of the respective GPU, and acquiring a current parameter of the respective GPU by using the integrated chip:

determining whether the current parameter of a target GPU is greater than a preset current threshold; when the current parameter of the target GPU is greater than the preset current threshold, determining that the target GPU is in a high workload state; and when the current parameter of the target GPU is not greater than the preset current threshold, determining that the target GPU is in a low workload state, wherein the target GPU is any GPU of the GPUs in the system:

distributing, in a balanced manner, a part of computing workloads of GPUs in the high workload state to GPUs in the low workload state, so that the GPUs originally in the high workload state transit to the low workload state.

In some exemplary implementations of the present disclosure, an integrated chip for acquiring power supply parameters of a respective GPU is pre-configured for the respective GPU, and the current parameter of the respective GPU is acquired by using the integrated chip. Considering that the current of the GPU in a high workload state is greater than the current of the GPU in a low workload state, a current threshold is set in the embodiments of the present disclosure such that the current of the GPU in the high workload state> the current threshold> the current of the GPU in the low workload state. After the current parameter of a target GPU is acquired, it is determined whether the current parameter of the target GPU is greater than the preset current threshold: if the current parameter of the target GPU is greater than the preset current threshold, it indicates that the target GPU is in the high workload state: if the current parameter of the target GPU is not greater than the preset current threshold, it indicates that the target GPU is in the low workload state, so as to determine the workload state of the GPU according to the magnitude of the current parameter of the target GPU.

Based on this, an exemplary process of adjusting the load balance distribution of the GPUs in the system is as follows: distributing, in a balanced manner, a part of computing workloads of GPUs in the high workload state to GPUs in the low workload state, so that the GPUs originally in the high workload state transit to the low workload state, thereby reducing the power consumption of the GPU of the system, and preventing the shutdown or restart of the system main power supply without affecting the computing performance of a server.

As an exemplary embodiment, the process of selecting the target turn-off GPU from the GPUs in the system according to the preset GPU turn-off selection policy and turning off the power supply of the target turn-off GPU includes:

pre-configuring, for a respective GPU of the GPUs in the system, an integrated chip for acquiring power supply parameters of the respective GPU, and acquiring a current parameter of the respective GPU by using the integrated chip:

determining whether the current parameter of a target GPU is greater than a preset current threshold, and when the current parameter of the target GPU is greater than the preset current threshold, determining that the target GPU is in a high workload state, wherein the target GPU is any GPU of the GPUs in the system:

sequentially triggering the power brake signal for a respective GPU of GPUs in the high workload state, until the actual utilization rate of the system main power supply decreases to the low-level utilization rate.

In some exemplary implementations, the determination principle of the workload state of the GPU has been mentioned in the above embodiments, and will not be repeated herein.

Based on this, an exemplary process of selecting the target trigger GPU from the GPUs in the system and triggering the power brake signal for the target trigger GPU is as follows: sequentially selecting GPUs in the high workload state from the GPUs in the system as target trigger GPUs, and triggering the power brake signal for the current target trigger GPU until the actual utilization rate of the system main power supply decreases to the low-level utilization rate.

It should be noted that, this sequential GPU triggering method may ensure the maximum allowable computing performance of the server as much as possible while preventing the shutdown or restart of the system.

As an exemplary embodiment, the process of selecting the target turn-off GPU from the GPUs in the system according to the preset GPU turn-off selection policy and turning off the power supply of the target turn-off GPU includes:

pre-configuring, for a respective GPU of the GPUs in the system, an integrated chip for acquiring power supply parameters of the respective GPU, and acquiring a current parameter of the respective GPU by using the integrated chip:

determining whether the current parameter of a target GPU is greater than a preset current threshold: when the current parameter of the target GPU is greater than the preset current threshold, determining that the target GPU is in a high workload state; and when the current parameter of the target GPU is not greater than the preset current threshold, determining that the target GPU is in a low workload state, wherein the target GPU is any GPU of the GPUs in the system:

first turning off power supply of GPUs in the low workload state, and then turning off power supply of GPUs in the high workload state, until the actual utilization rate of the system main power supply decreases to the medium-level utilization rate.

In some exemplary implementations, the determination principle of the workload state of the GPU has been mentioned in the above embodiments, and will not be repeated herein.

Based on this, an exemplary process of selecting the target turn-off GPU from the GPUs in the system and turning off the power supply of the target turn-off GPU is as follows: first selecting GPUs in the low workload state from the GPUs in the system as target turn-off GPUs in sequence: after the selection of the GPUs in the low workload state is completed, selecting the GPUs in the high workload state as the target turn-off GPUs in sequence; and turning off the power supply of the current target turn-off GPU until the actual utilization rate of the system main power supply decreases to the medium-level utilization rate.

It should be noted that, such a method of first turning off power supply of GPUs in the low workload state and turning off the power supply in sequence may ensure the maximum allowable computing performance of the server as much as possible while preventing the shutdown or restart of the system.

As an exemplary embodiment, the power supply control method for the server may further include:

respectively comparing a respective one of the power supply parameters of the target GPU acquired by using the integrated chip with a preset parameter security threshold corresponding to the respective power supply parameter; and when any power supply parameter of the target GPU is greater than the preset parameter security threshold corresponding to the power supply parameter, directly turning off the power supply of the target GPU by using the integrated chip.

Further, in the embodiments of the present disclosure, a respective power supply parameter of a target GPU acquired by using an integrated chip may also be respectively compared with preset parameter security thresholds corresponding to the respective power supply parameter. For example, a current parameter of the target GPU is compared with a preset current parameter security threshold corresponding to the current parameter: the voltage parameter of the target GPU is compared with a preset voltage parameter safety threshold corresponding to the voltage parameter: if any power supply parameter of the target GPU is greater than the preset parameter security threshold corresponding to the power supply parameter, the power supply of the target GPU is directly turned off by using the integrated chip, thereby preventing the GPU chip from being burnt.

Figure 3:
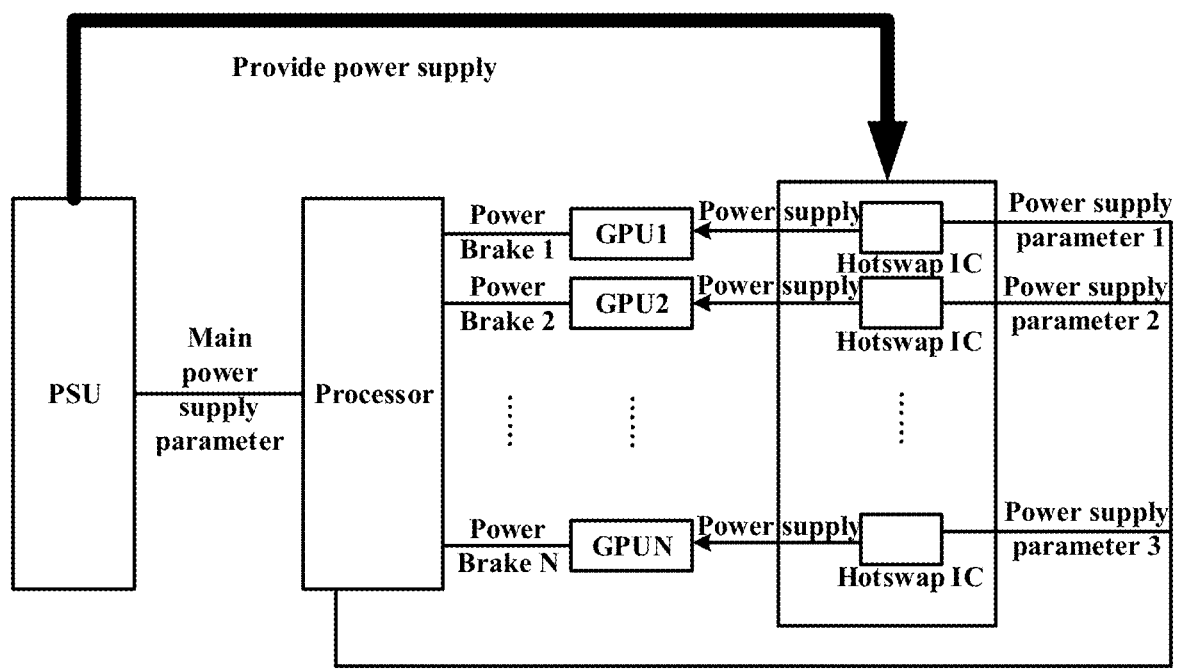
FIG. 3 is a schematic structural diagram of a power supply system for a GPU in a server according to the embodiments of the present disclosure.

In conclusion, as shown in FIG. 3, a power supply system for GPUs in a server includes a PSU and a power supply control device, wherein the power supply control device includes a processor and an integrated chip (Hotswap IC) for acquiring power supply parameters of the GPU, and the processor is used for implementing operations of any power supply control method for a server when a computer program stored in a memory is executed.

The embodiments of the present disclosure also provide a power supply control system for a server, including:

a presetting module, configured to divide a utilization rate of a system main power supply into different levels in advance, and set a GPU power control policy corresponding to a respective one of the different levels of the utilization rate of the system main power supply, wherein the level of the utilization rate of the system main power supply increases with the increase in the utilization rate of the system main power supply, and a suppression degree, on a computing capability of GPUs in a system, of the set GPU power control policy increases with the increase in the level of the utilization rate of the system main power supply:

a determination module, configured to acquire an actual utilization rate of the system main power supply, and determine, according to a result of the level division on the utilization rate of the system main power supply, a target utilization rate level corresponding to the actual utilization rate; and a control module, configured to perform power supply control on the GPUs in the system according to the GPU power control policy corresponding to the target utilization rate level.

As an exemplary embodiment, the presetting module is configured to:

divide the utilization rate of the system main power supply into three levels in advance, to obtain a low-level utilization rate, a medium-level utilization rate and a high-level utilization rate:

set, corresponding to the low-level utilization rate, a first GPU power control policy used for adjusting load balance distribution of the GPUs in the system:

set, corresponding to the medium-level utilization rate, a second GPU power control policy used for selecting a target trigger GPU from the GPUs in the system according to a preset GPU trigger selection policy, and triggering a power brake signal for the target trigger GPU:

set, corresponding to the high-level utilization rate, a third GPU power control policy used for selecting a target turn-off GPU from the GPUs in the system according to a preset GPU turn-off selection policy and turning off power supply of the target turn-off GPU.

As an exemplary embodiment, the process of adjusting load balance distribution of the GPUs in the system includes:

pre-configuring, for a respective GPU of the GPUs in the system, an integrated chip for acquiring power supply parameters of the respective GPU, and acquiring a current parameter of the respective GPU by using the integrated chip:

determining whether the current parameter of a target GPU is greater than a preset current threshold: when the current parameter of the target GPU is greater than the preset current threshold, determining that the target GPU is in a high workload state; and when the current parameter of the target GPU is not greater than the preset current threshold, determining that the target GPU is in a low workload state, wherein the target GPU is any GPU of the GPUs in the system:

distributing, in a balanced manner, a part of computing workloads of GPUs in the high workload state to GPUs in the low workload state, so that the GPUs originally in the high workload state transit to the low workload state.

For an introduction to the power supply control system provided in the embodiments of the present disclosure, reference could be made to the foregoing embodiments of the power supply control method, and details are not repeated herein.

The embodiments of the present disclosure also provide a power supply control device for a server, including:

a memory, configured to store a computer program; and a processor, provided between a system main power supply and GPUs in the system, and configured to implement operations of the power supply control method for the server when executing the computer program.

For an introduction to the power supply control device provided in the embodiments of the present disclosure, reference could be made to the foregoing embodiments of the power supply control method, and details are not repeated herein.

It should be noted that in the present description, relational terms such as first and second are only used to distinguish one entity or operation from another entity or operation, and do not require or imply any actual relationship or sequence between these entities or operations. Furthermore, the terms "comprise", "comprises", or any other variations thereof are intended to cover a non-exclusive inclusion, so that a process, a method, an article, or a device that comprises a series of elements not only comprises those elements, but also comprises other elements that are not explicitly listed, or may further comprise inherent elements of the process, the method, the article, or the device. Without further limitation, an element defined by a sentence "comprising a . . . " does not exclude other same elements existing in a process, a method, a commodity, or a device that comprises the element.

Based on the above description of the disclosed embodiments, those having ordinary skill in the art may implement or use the embodiments of the present disclosure. It is obvious for those having ordinary skill in the art to make many modifications to these embodiments. The general principle defined herein may be applied to other embodiments without departing from the principle or scope of the present disclosure. Therefore, the present disclosure is not limited to the embodiments illustrated herein, but should be defined by the widest scope consistent with the principle and novel features disclosed herein.

What is claimed is:

1. A power supply control method for a server, comprising:
dividing a utilization rate of a system main power supply into different levels in advance, and setting a Graphics Processing Unit (GPU) power control policy corresponding to a respective one of the different levels of the utilization rate of the system main power supply, wherein the level of the utilization rate of the system main power supply increases with the increase in the utilization rate of the system main power supply, and a suppression degree, on a computing capability of GPUs in a system, of the set GPU power control policy increases with the increase in the level of the utilization rate of the system main power supply;
acquiring an actual utilization rate of the system main power supply, and determining, according to a result of the level division on the utilization rate of the system main power supply, a target utilization rate level corresponding to the actual utilization rate; and
performing power supply control on the GPUs in the system according to the GPU power control policy corresponding to the target utilization rate level.

2. The power supply control method for the server according to claim 1,
wherein performing the level division on the utilization rate of the system main power supply in advance, and setting the GPU power control policy corresponding to the respective one of the different levels of the utilization rate of the system main power supply comprises:
dividing the utilization rate of the system main power supply into three levels in advance, to obtain a low-level utilization rate, a medium-level utilization rate and a high-level utilization rate;
setting, corresponding to the low-level utilization rate, a first GPU power control policy used for adjusting load balance distribution of the GPUs in the system;
setting, corresponding to the medium-level utilization rate, a second GPU power control policy used for selecting a target trigger GPU from the GPUs in the system according to a preset GPU trigger selection policy, and triggering a power brake signal for the target trigger GPU; and
setting, corresponding to the high-level utilization rate, a third GPU power control policy used for selecting a target turn-off GPU from the GPUs in the system according to a preset GPU turn-off selection policy and turning off power supply of the target turn-off GPU.

3. The power supply control method for the server according to claim 2,
wherein adjusting the load balance distribution of the GPUs in the system comprises:
pre-configuring, for a respective GPU of the GPUs in the system, an integrated chip for acquiring power supply parameters of the respective GPU, and acquiring a current parameter of the respective GPU by using the integrated chip;
determining whether the current parameter of a target GPU is greater than a preset current threshold; when the current parameter of the target GPU is greater than the preset current threshold, determining that the target GPU is in a high workload state; and when the current parameter of the target GPU is not greater than the preset current threshold, determining that the target GPU is in a low workload state, wherein the target GPU is any GPU of the GPUs in the system; and
distributing, in a balanced manner, a part of computing workloads of GPUs in the high workload state to GPUs in the low workload state, so that the GPUs originally in the high workload state transit to the low workload state.

4. The power supply control method for the server according to claim 3, further comprising:
respectively comparing a respective one of the power supply parameters of the target GPU acquired by using the integrated chip with a preset parameter security threshold corresponding to the respective power supply parameter; and when any power supply parameter of the target GPU is greater than the preset parameter security threshold corresponding to the power supply parameter, directly turning off the power supply of the target GPU by using the integrated chip.

5. The power supply control method for the server according to claim 2, wherein selecting the target trigger GPU from the GPUs in the system according to the preset GPU trigger selection policy, and triggering the power brake signal for the target trigger GPU comprises:
pre-configuring, for a respective GPU of the GPUs in the system, an integrated chip for acquiring power supply parameters of the respective GPU, and acquiring a current parameter of the respective GPU by using the integrated chip;
determining whether the current parameter of a target GPU is greater than a preset current threshold, and when the current parameter of the target GPU is greater than the preset current threshold, determining that the target GPU is in a high workload state, wherein the target GPU is any GPU of the GPUs in the system; and
sequentially triggering the power brake signal for a respective GPU of GPUs in the high workload state, until the actual utilization rate of the system main power supply decreases to the low-level utilization rate.

6. The power supply control method for the server according to claim 5, further comprising:
respectively comparing a respective one of the power supply parameters of the target GPU acquired by using the integrated chip with a preset parameter security threshold corresponding to the respective power supply parameter; and when any power supply parameter of the target GPU is greater than the preset parameter security threshold corresponding to the power supply parameter, directly turning off the power supply of the target GPU by using the integrated chip.

7. The power supply control method for the server according to claim 2, wherein selecting the target turn-off GPU from the GPUs in the system according to the preset GPU turn-off selection policy and turning off the power supply of the target turn-off GPU comprises:
pre-configuring, for a respective GPU of the GPUs in the system, an integrated chip for acquiring power supply parameters of the respective GPU, and acquiring a current parameter of the respective GPU by using the integrated chip;
determining whether the current parameter of a target GPU is greater than a preset current threshold; when the current parameter of the target GPU is greater than the preset current threshold, determining that the target GPU is in a high workload state; and when the current parameter of the target GPU is not greater than the preset current threshold, determining that the target GPU is in a low workload state, wherein the target GPU is any GPU of the GPUs in the system; and first turning off power supply of GPUs in the low workload state, and then turning off power supply of GPUs in the high workload state, until the actual utilization rate of the system main power supply decreases to the medium-level utilization rate.

8. The power supply control method for the server according to claim 7, further comprising:

respectively comparing a respective one of the power supply parameters of the target GPU acquired by using the integrated chip with a preset parameter security threshold corresponding to the respective power supply parameter; and when any power supply parameter of the target GPU is greater than the preset parameter security threshold corresponding to the power supply parameter, directly turning off the power supply of the target GPU by using the integrated chip.

9. The power supply control method for the server according to claim 7, wherein first turning off power supply of GPUs in the low workload state, and then turning off power supply of GPUs in the high workload state, until the actual utilization rate of the system main power supply decreases to the medium-level utilization rate comprises:

first sequentially turning off the power supply of the GPUs in the low workload state, and then sequentially turning off the power supply of GPUs in the high workload state, until the actual utilization rate of the system main power supply decreases to the medium-level utilization rate.

10. The power supply control method for the server according to claim 1, wherein dividing the utilization rate of the system main power supply into different levels in advance comprises:

dividing the utilization rate, which is equal to or above a preset threshold, of the system main power supply into different levels in advance.

11. The power supply control method for the server according to claim 1, wherein determining, according to the result of the level division on the utilization rate of the system main power supply, the target utilization rate level corresponding to the actual utilization rate comprises:

determining, according to a correlation between the level of the utilization rate of the system main power supply and the GPU power control policy, the target utilization rate level corresponding to the actual utilization rate.

12. A power supply control system for a server, comprising a Power Supply Unit (PSU) and a power supply control device, wherein the power supply control device comprises:

a processor connected between the PSU and Graphics Processing Units (GPUs) and configured to implement following operations when a computer program stored in a memory is executed:

dividing a utilization rate of a system main power supply into different levels in advance, and setting a (GPU) power control policy corresponding to a respective one of the different levels of the utilization rate of the system main power supply, wherein the level of the utilization rate of the system main power supply increases with the increase in the utilization rate of the system main power supply, and a suppression degree, on a computing capability of GPUs in a system, of the set GPU power control policy increases with the increase in the level of the utilization rate of the system main power supply;

acquiring an actual utilization rate of the system main power supply, and determining, according to a result of the level division on the utilization rate of the system main power supply, a target utilization rate level corresponding to the actual utilization rate; and performing power supply control on the GPUs in the system according to the GPU power control policy corresponding to the target utilization rate level.

13. The power supply control system for the server according to claim 12, wherein the power supply control device further comprises integrated chips respectively connected with the GPUs, and the integrated chips are used for acquiring power supply parameters of the respective GPUs.

14. The power supply control system for the server according to claim 13, wherein the integrated chips are Hotswap Integrated Circuits (ICs).

15. A power supply control device for a server, comprising:

a memory, configured to store a computer program; and a processor, provided between a system main power supply and Graphics Processing Units (GPUs) in a system, and configured to implement following operations when executing the computer program:

dividing a utilization rate of a system main power supply into different levels in advance, and setting a Graphics Processing Unit (GPU) power control policy corresponding to a respective one of the different levels of the utilization rate of the system main power supply, wherein the level of the utilization rate of the system main power supply increases with the increase in the utilization rate of the system main power supply, and a suppression degree, on a computing capability of GPUs in a system, of the set GPU power control policy increases with the increase in the level of the utilization rate of the system main power supply;

acquiring an actual utilization rate of the system main power supply, and determining, according to a result of the level division on the utilization rate of the system main power supply, a target utilization rate level corresponding to the actual utilization rate; and performing power supply control on the GPUs in the system according to the GPU power control policy corresponding to the target utilization rate level.

16. The power supply control device for the server according to claim 15, wherein performing the level division on the utilization rate of the system main power supply in advance, and setting the GPU power control policy corresponding to the respective one of the different levels of the utilization rate of the system main power supply comprises:

dividing the utilization rate of the system main power supply into three levels in advance, to obtain a low-level utilization rate, a medium-level utilization rate and a high-level utilization rate;

setting, corresponding to the low-level utilization rate, a first GPU power control policy used for adjusting load balance distribution of the GPUs in the system;

setting, corresponding to the medium-level utilization rate, a second GPU power control policy used for selecting a target trigger GPU from the GPUs in the system according to a preset GPU trigger selection policy, and triggering a power brake signal for the target trigger GPU; and setting, corresponding to the high-level utilization rate, a third GPU power control policy used for selecting a target turn-off GPU from the GPUs in the system according to a preset GPU turn-off selection policy and turning off power supply of the target turn-off GPU.

17. The power supply control device for the server according to claim 16, wherein adjusting the load balance distribution of the GPUs in the system comprises:
- pre-configuring, for a respective GPU of the GPUs in the system, an integrated chip for acquiring power supply parameters of the respective GPU, and acquiring a current parameter of the respective GPU by using the integrated chip;
- determining whether the current parameter of a target GPU is greater than a preset current threshold; when the current parameter of the target GPU is greater than the preset current threshold, determining that the target GPU is in a high workload state; and when the current parameter of the target GPU is not greater than the preset current threshold, determining that the target GPU is in a low workload state, wherein the target GPU is any GPU of the GPUs in the system; and
- distributing, in a balanced manner, a part of computing workloads of GPUs in the high workload state to GPUs in the low workload state, so that the GPUs originally in the high workload state transit to the low workload state.

18. The power supply control device for the server according to claim 17, wherein the processor is further configured to implement following operation when executing the computer program:
- respectively comparing a respective one of the power supply parameters of the target GPU acquired by using the integrated chip with a preset parameter security threshold corresponding to the respective power supply parameter; and when any power supply parameter of the target GPU is greater than the preset parameter security threshold corresponding to the power supply parameter, directly turning off the power supply of the target GPU by using the integrated chip.

19. The power supply control device for the server according to claim 16, wherein selecting the target trigger GPU from the GPUs in the system according to the preset GPU trigger selection policy, and triggering the power brake signal for the target trigger GPU comprises:
- pre-configuring, for a respective GPU of the GPUs in the system, an integrated chip for acquiring power supply parameters of the respective GPU, and acquiring a current parameter of the respective GPU by using the integrated chip;
- determining whether the current parameter of a target GPU is greater than a preset current threshold, and when the current parameter of the target GPU is greater than the preset current threshold, determining that the target GPU is in a high workload state, wherein the target GPU is any GPU of the GPUs in the system; and
- sequentially triggering the power brake signal for a respective GPU of GPUs in the high workload state, until the actual utilization rate of the system main power supply decreases to the low-level utilization rate.

20. The power supply control device for the server according to claim 16, wherein selecting the target turn-off GPU from the GPUs in the system according to the preset GPU turn-off selection policy and turning off the power supply of the target turn-off GPU comprises:
- pre-configuring, for a respective GPU of the GPUs in the system, an integrated chip for acquiring power supply parameters of the respective GPU, and acquiring a current parameter of the respective GPU by using the integrated chip;
- determining whether the current parameter of a target GPU is greater than a preset current threshold; when the current parameter of the target GPU is greater than the preset current threshold, determining that the target GPU is in a high workload state; and when the current parameter of the target GPU is not greater than the preset current threshold, determining that the target GPU is in a low workload state, wherein the target GPU is any GPU of the GPUs in the system; and
- first turning off power supply of GPUs in the low workload state, and then turning off power supply of GPUs in the high workload state, until the actual utilization rate of the system main power supply decreases to the medium-level utilization rate.

* * * * *